United States Patent
Cevher (10) Patent No.: US 10,110,472 B2
(45) Date of Patent: Oct. 23, 2018

(54) FAILURE PROTECTION FOR SOFTWARE DEFINED NETWORKS USING MULTI-TOPOLOGY ROUTING BASED FAST REROUTE

(71) Applicant: OZYEGIN UNIVERSITESI, Istanbul (TR)

(72) Inventor: Selçuk Cevher, Trabzon (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 33 days.

(21) Appl. No.: 15/392,794

(22) Filed: Dec. 28, 2016

(65) Prior Publication Data

US 2018/0183704 A1 Jun. 28, 2018

(51) Int. Cl.
*H04L 12/707* (2013.01)
*H04L 12/741* (2013.01)
*H04L 12/721* (2013.01)
*H04L 29/06* (2006.01)
*H04L 12/46* (2006.01)

(52) U.S. Cl.
CPC .......... *H04L 45/24* (2013.01); *H04L 12/4641* (2013.01); *H04L 45/22* (2013.01); *H04L 45/38* (2013.01); *H04L 45/745* (2013.01); *H04L 65/4076* (2013.01)

(58) Field of Classification Search
CPC ..... H04L 12/4641; H04L 45/22; H04L 45/24; H04L 45/38; H04L 45/745; H04L 65/4076
See application file for complete search history.

(56) References Cited

U.S. PATENT DOCUMENTS

| 8,374,092 B2 | 2/2013 | Previdi et al. |
| 2015/0207671 A1* | 7/2015 | Farkas ................ H04L 45/48 370/228 |
| 2016/0234106 A1 | 8/2016 | Li |

FOREIGN PATENT DOCUMENTS

CN 105282044 A 1/2016

OTHER PUBLICATIONS

Sharma, S., Staessens, D., Colle, D., Pickavet, M. and Demeester, P., OpenFlow: Meeting Carrier-Grade Recovery Requirements, Computer Communications (Elsevier), 36, 6 (2013) 656-665.

(Continued)

*Primary Examiner* — Benjamin H Elliott, IV
(74) *Attorney, Agent, or Firm* — Egbert Law Offices, PLLC (57) ABSTRACT

A software defined networking (SDN) controller and methods for protecting against failure of a network element in a forwarding plane are provided. A multi-topology routing based IP fast re-route (MTR-IPFRR) process is configured to: if a new traffic flow is detected in the forwarding plane, determine a primary path for relaying network traffic to a destination node using primary forwarding tables; for each network element along the primary path, determine and associate a virtual topology (VT) which protects the network element from relaying network traffic; determine a protecting path for each protected network element along the primary path using an associated VT; and program each node along the primary path to be switchable to a protecting path associated with an adjacent network element to reroute network traffic from an anticipated failed network element.

13 Claims, 9 Drawing Sheets

(56) References Cited

OTHER PUBLICATIONS

Braun, W. and Menth, M., Scalable Resilience for Software-Defined Networking Using Loop-Free Alternates with Loop Detection, IEEE Network Softwarization, 2015, London, 1-6.

Adrichem, N.L.M., Asten, B.J. and Kuipers, F.A., Fast Recovery in Software Defined Networks, European Workshop on Software Defined Networks, 2014, Budapest, 61-66.

Kempf, J., Bellagamba, E., Kern, A., Jocha, D., Takacs, A. and Skoldstrom, P., Scalable Fault Management for OpenFlow, IEEE International Conference on Communications (ICC), 2012, Ottawa, 6606-6610.

Jain, S., Kumar, A., Mandal, S., Ong, J., Poutievski, L., Singh, A., Venkata, S., Wanderer, J., Zhou, J., Zhu, M., Zolla, J., Holzle, U., Stuart, S. and Vahdat, A., B4: Experience with a Globally-Deployed Software Defined WAN, SIGCOMM, 2013, Hong Kong, 3-14.

* cited by examiner

(a) Physical Topology  (b) Virtual Topology 1

(c) Virtual Topology 2  (d) Virtual Topology 3

FAILURE PROTECTION FOR SOFTWARE DEFINED NETWORKS USING MULTI-TOPOLOGY ROUTING BASED FAST REROUTE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to failure protection and recovery in networks, and more particularly to fast recovery from single failures in software defined networks using multi-topology routing based fast reroute.

2. Description of Related Art Including Information Disclosed Under 37 CFR 1.97 and 37 CFR 1.98

The rapid growth in networking devices and the data they use, along with server virtualization, the use of cloud services, as well as many other changes, have caused many in the telecommunications industry to re-examine the network architectures that have been previously used.

Traditional communication networks incorporate a plurality of networking hardware each of which is responsible for performing both control and data forwarding tasks. Since this form of architecture requires the individual configuration of each hardware component in order to enforce a network-wide policy, it is challenging to dynamically adapt the operation of the traditional networks for the changing needs that have evolved around new computer usage scenarios. If a dynamic re-configuration capability can be incorporated into the communication networks, the limited network resources can be used more efficiently as the network conditions change. For this purpose, a more efficient, flexible, and agile network architecture is needed.

As a result of the above-mentioned drawbacks and the insufficiencies of previous solutions, improvements are required to be made in the related technical field.

BRIEF SUMMARY OF THE INVENTION

To address challenges and requirements in data forwarding, the present disclosure presents new methods and systems for failure protection in software defined networks using multi-topology routing based fast reroute. Existing techniques are not well-established to be deployed in a real network to carry out failure recovery or failure protection, and are not easily extensible to balance the link loads in the network during the recovery or protection process. They are either computationally complex, do not provide full failure coverage, or work under restricted scenarios requiring the intervention by the network operator for the configuration of the forwarding devices.

Software defined networking (SDN) is an approach to computer networking that allows network administrators to manage network services through abstraction of lower-level functionality. This is done by decoupling or disassociating the system that makes decisions about where traffic is sent (the control plane) from the underlying systems that forward traffic to the selected destination (the forwarding plane or the data plane). In other words, using software defined networking, the network control is detached from the elements of the network that provide the data forwarding.

With software providing a means by which much functionality can be provided, its adoption into networking enables many features to be run using software rather than hardware. By structuring the network architecture in this way into accessible computing devices, the underlying infrastructure can be abstracted for applications and network services to treat the network as a logical or virtual entity rather than a large number of tightly bound devices. The intelligence for the network is typically included within an SDN controller(s) which is able to control the complete network. In this way, the whole network can be treated by the applications and policy entities as a single large logical switch.

By adopting this SDN approach, the whole network can be controlled from a single point. This greatly simplifies the design, operation and updates for the network. SDN also simplifies the network devices themselves as they only need to interface with a single control standard and not the many protocol standards they would otherwise need to process.

The Quality of Service (QoS) requirements of real-time services in SDN necessitate the fast replacement of the primary paths for the traffic flows disrupted by a single inter-switch link or switch failure in the forwarding plane by loop-free alternate paths.

Fast recovery from network failures in the forwarding plane can be accomplished using two different approaches: restoration and protection. In the restoration approach, alternate routing tables are pro-actively computed by the controller in advance of the failure while the switch resources for the alternate paths are allocated upon the detection of the failure. On the other hand, in the protection approach, both the computation of the alternate paths and the allocation of the resources are performed in advance of the failure. The protection approach provides a shorter failure recovery time compared to the restoration approach since the pro-active computation and establishment of the alternate paths shortens the time required to activate the new paths.

The present invention provides a novel failure protection mechanism for SDN relying on multi-topology routing based IP fast re-route (MTR-IPFRR). It leads to a self-recovering SDN against failures by not requiring any manual operation by the network operator. The present invention considerably reduces the failure recovery time compared to a reactive recovery process in SDN. The present invention provides a full definition of the stages to be performed in an automatic recovery process beginning from the detection of the network failure to the replacement of the disrupted primary paths.

Prior to a failure detection, MTR-IPFRR uses virtual topologies (VTs) to pro-actively compute alternate paths for the traffic flows affected from the anticipated failure of a network element. A router which actually detects a failure immediately starts to reroute the affected traffic over a pre-calculated VT where the failed component is isolated. MTR-IPFRR can also be extended for traffic engineering applications and operations on the data plane due to its flexibility to freely choose the link weights in VTs. This capability of MTR-IPFRR allows for fast failure recovery while balancing the link loads during the recovery process. Furthermore, MTR-IPFRR does not require the identification of the failure cause, namely, the knowledge of whether the failed component is an inter-switch link or a switch itself.

In accordance with an embodiment of the present invention, a software defined networking (SDN) controller for protecting against failure of a network element in a forwarding plane is provided. The SDN controller comprises a processor configured to execute software processes, and a memory configured to store a multi-topology routing based IP fast re-route (MTR-IPFRR) process executable by the processor. The MTR-IPFRR process is configured to: discover a physical topology of the forwarding plane; determine a primary forwarding table for each node of the forwarding plane based upon the discovered physical topology; and if a new traffic flow is detected in the forwarding plane, determine a primary path for relaying network traffic to a destination node using the primary forwarding tables. The MTR-IPFRR process is further configured to: for each network element along the primary path, determine and associate a virtual topology (VT) which protects the network element from relaying network traffic; determine a protecting path for each protected network element along the primary path using an associated VT; and program each node along the primary path to be switchable to a protecting path associated with an adjacent network element to reroute network traffic from the failed network element.

In accordance with another embodiment of the present invention, another SDN controller for protecting against failure of a network element in a forwarding plane is provided. The SDN controller comprises: a processor configured to execute software processes; and a memory configured to store a plurality of MTR databases, each MTR database for an independent network topology among a plurality of network elements of the forwarding plane. The memory is further configured to store an MTR-IPFRR process executable by the processor, the MTR-IPFRR process configured to: discover a physical topology of the forwarding plane via a link discovery protocol; determine a primary forwarding table for each node of the forwarding plane based upon the discovered physical topology; determine a plurality of virtual topologies (VTs) based upon the topology of the forwarding plane, wherein each VT includes the same nodes and links as in the physical topology of the forwarding plane, and further wherein each VT has different link weights from each other; and if a new traffic flow is detected in the forwarding plane, determine a primary path for relaying network traffic to a destination node using the primary forwarding tables. The MTR-IPFRR process is further configured to: for each network element along the primary path, determine and associate a VT which protects the network element from relaying network traffic by isolation; determine a protecting path for each protected network element along the primary path using an associated VT; and prior to detecting failure of a network element, program each node along the primary path to be switchable to a protecting path associated with an adjacent network element to reroute network traffic from the failed network element. In other words, the MTR-IPFRR process is configured to establish each protecting path, in advance of any failure, by programming each switch along the primary path to be switchable to a protecting path associated with its adjacent network element (the network element prior to or before the potentially failed network element) to reroute network traffic in case of the failure of the network element.

In accordance with yet another embodiment of the present invention, a method for protecting against failure of a network element in a forwarding plane is provided. The method comprises: discovering a physical topology of the forwarding plane via a link discovery protocol; determining a primary forwarding table for each node of the forwarding plane based upon the discovered physical topology; if a new traffic flow is detected in the forwarding plane, determining a primary path for relaying network traffic to a destination node using the primary forwarding tables; for each network element along the primary path, determining and associating a VT which protects the network element from relaying network traffic; determining a protecting path for each protected network element along the primary path using an associated VT; and programming each node along the primary path to be switchable to a protecting path associated with an adjacent network element to reroute traffic from the failed network element.

Advantageously, the systems and methods of the present disclosure provide highly adaptive protocols resulting in significantly enhanced system performance and efficiencies.

BRIEF DESCRIPTION OF THE SEVERAL VIEWS OF THE DRAWINGS

Systems and methods according to the invention and some particular embodiments thereof will now be described with reference to the following figures. These and other features, aspects, and advantages of the present invention will become better understood when the following detailed description is read with reference to the accompanying drawings in which like characters represent like parts throughout the drawings. Some embodiments are illustrated by way of example and not limitation in the figures of the accompanying drawings. Unless noted, the drawings may not be drawn to scale.

DETAILED DESCRIPTION OF THE INVENTION

Various modifications to the example embodiments set forth herein will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
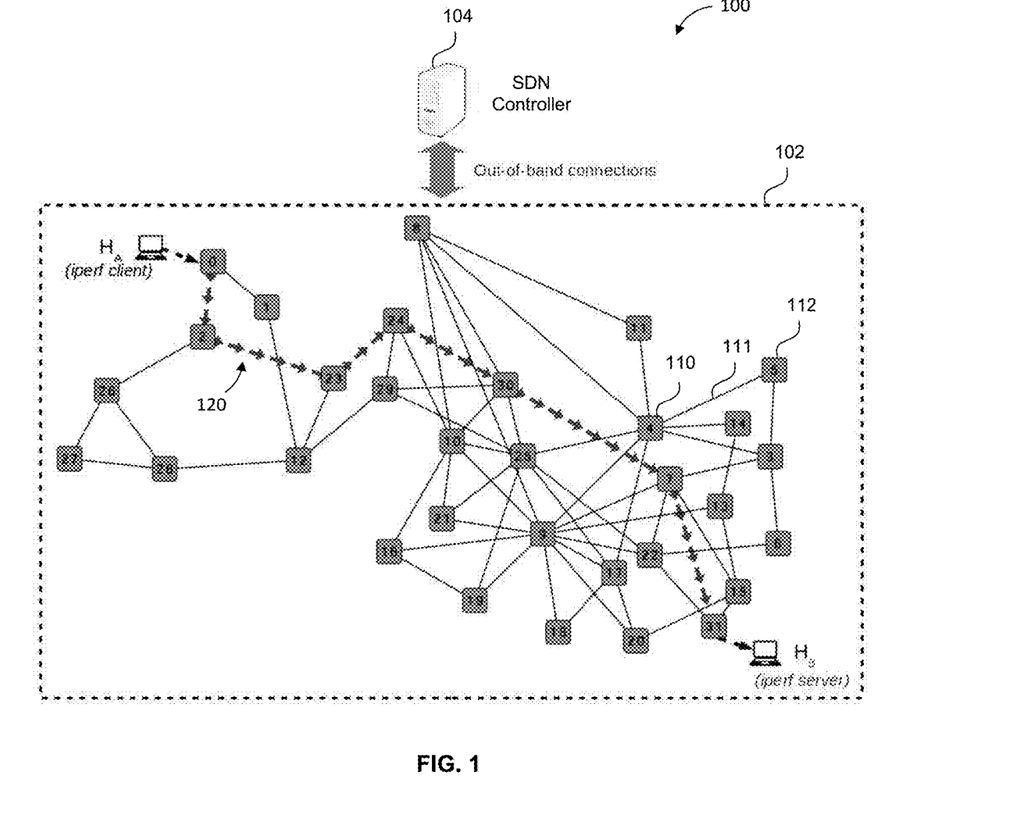
FIG. 1 illustrates a system including a computer network and an SDN controller for enhanced computer network routing in accordance with some embodiments of the present invention.

Referring now to FIG. 1, a system 100 including a forwarding plane 102 (also "data plane" or "computer network") and a software defined networking (SDN) controller 104 for enhanced computer network routing is illustrated in accordance with some embodiments of the present invention. Forwarding plane 102 includes a plurality of network elements including a plurality of nodes (e.g., shown by boxed numbers 0 through 31) (e.g., nodes 110, 112) with links between pairs of nodes (e.g., link 111). A client computer HA is coupled to a server computer HB by the plurality of network elements, and a primary path 120 for data flow from client computer HA to server computer HB through the nodes and links is illustrated by arrows.

Figure 2:
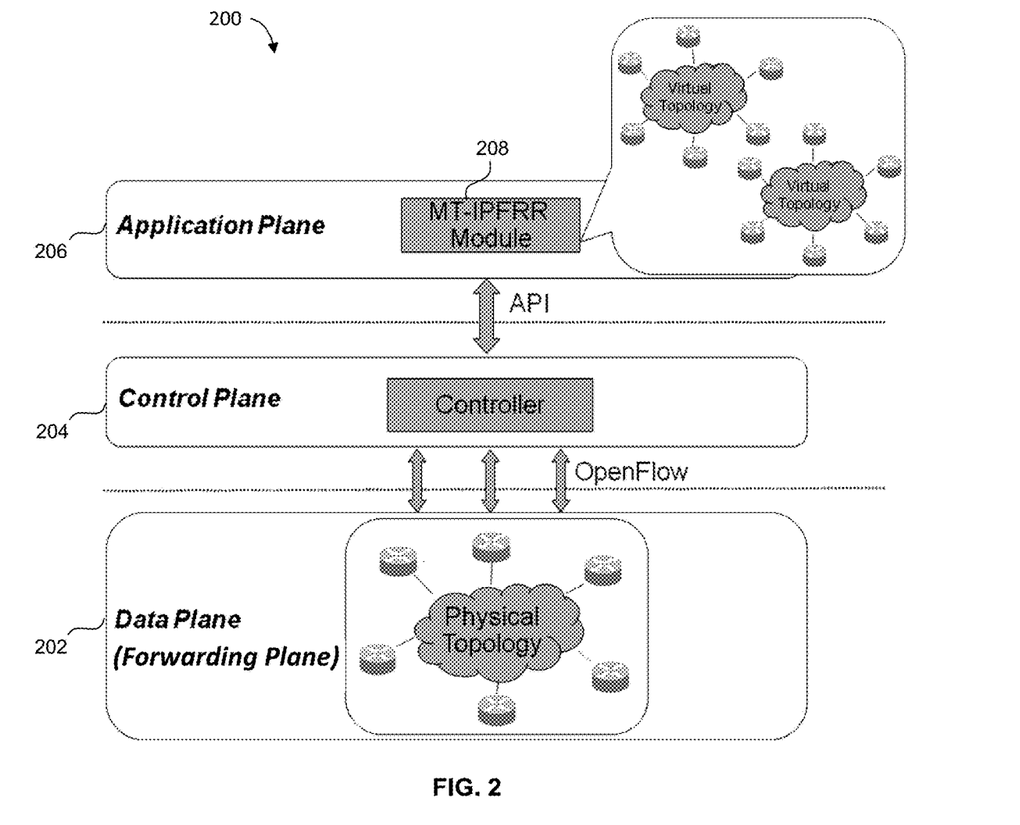
FIG. 2 illustrates a logical view of SDN network architecture incorporating an MTR-IPFRR module which include three layers: a data plane (also known as a forwarding plane or an infrastructure layer), a control plane, and an application plane, in accordance with some embodiments of the present invention.

FIG. 2 illustrates an SDN architecture 200 including a data plane 202 (also "forwarding plane" or "computer network"), a control plane 204, and an application plane 206 in accordance with some embodiments of the present invention. A physical topology may be discovered from the forwarding plane 202, a controller in the control plane 204 may be used to control the network elements of the forwarding plane 202, and an MTR-IPFRR module 208 in the application plane 206 may be used to determine virtual topologies for alternate routing of traffic flows affected from a network element failure. The MTR-IPFRR module 208 can be implemented as an application module in the application plane of the SDN architecture.

Figure 3:
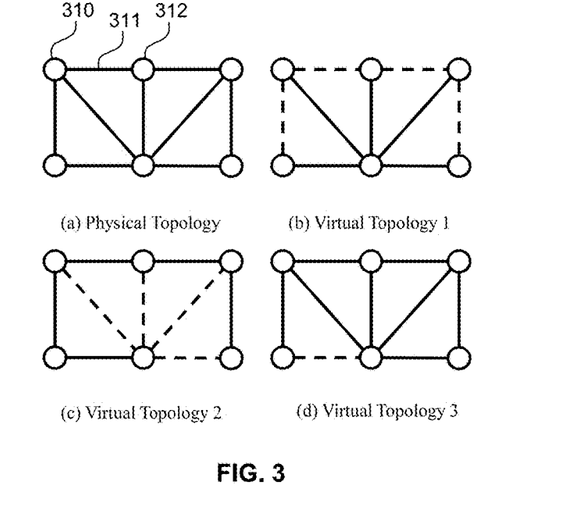
FIG. 3 illustrates an example physical topology and example virtual topologies in accordance with some embodiments of the present invention.

FIG. 3 demonstrates the general principle of MTR-IPFRR for link protection by illustrating an example physical topology and example virtual topologies in accordance with some embodiments of the present invention. In MTR-IPFRR, each node and link is prevented from carrying transit traffic in exactly one of the VTs. In FIG. 3, part (a) illustrates a physical topology of a forwarding plane, with nodes shown by circles (e.g., nodes 310, 312), and links shown by lines (e.g., link 311) connecting the circles. Example virtual topologies 1-3 are shown in parts (b), (c), and (d), respectively, based upon the physical topology of (a). The links shown by dashed lines are assigned a very high weight, and, hence, are prevented from carrying transit traffic.

Figure 4:
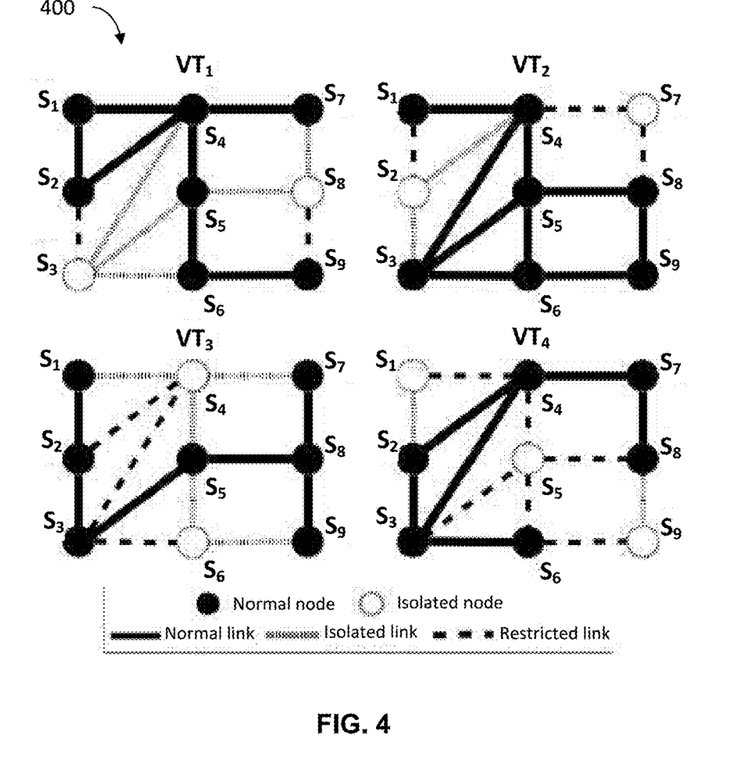
FIG. 4 illustrates example virtual topologies in accordance with some embodiments of the present invention.

FIG. 4 illustrates another set of example virtual topologies (VT1-VT4) based upon a different physical topology than that shown in FIG. 3. The virtual topologies VT1-VT4 are computed by the MTR-IPFRR module shown in FIG. 2 using the Multiple Routing Configurations (MRC) VT construction method. A normal node is shown by a solid circle and an isolated node is shown by an open circle. A normal link is shown by a solid line, an isolated link is shown by vertically-segmented lines, and a restricted link is shown by dashed lines. A normal node or link can be used to relay transit traffic while an isolated node or link cannot be used to forward any transit traffic. A restricted link can only be used to forward traffic sourced at or destined to one of its end-point switches.

Figure 5:
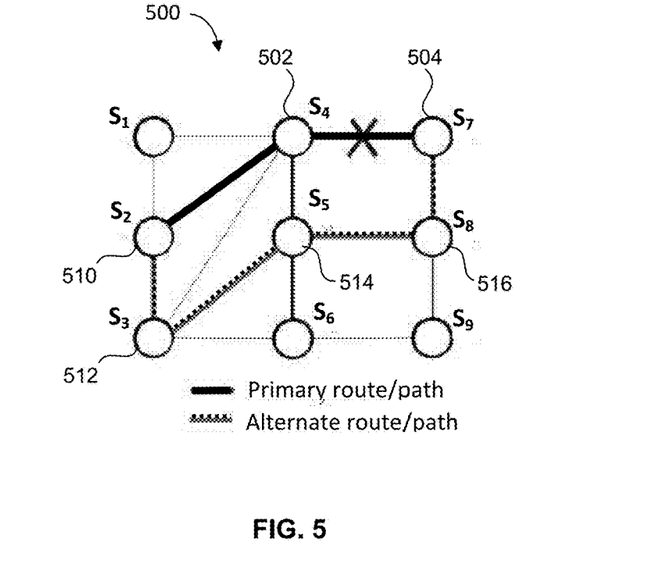
FIG. 5 illustrates a primary route and a protecting route for failure protection which is computed based on the VTs in FIG. 4 in accordance with some embodiments of the present invention.

FIG. 5 illustrates a primary route and a protecting route for failure protection in the physical topology of a forwarding plane of FIG. 4 in accordance with some embodiments of the present invention. Both the primary and protecting routes are computed by the MTR-IPFRR module in FIG. 2 following the discovery of the physical topology of the forwarding plane. A link between node 502 (S4) and node 504 (S7) along a primary path (shown by thick lines) is shown to fail by an "X", and an alternate route or protecting path from node 510 to node 512 to node 514 to node 516 to node 504 is illustrated by segmented lines. This protecting path is pro-actively computed by the MTR-IPFRR module using VT3 in FIG. 4 where the link between node 502 (S4) and node 504 (S7) is isolated, and is established by the MTR-IPFRR module along with the establishment of the primary path.

Figure 6:
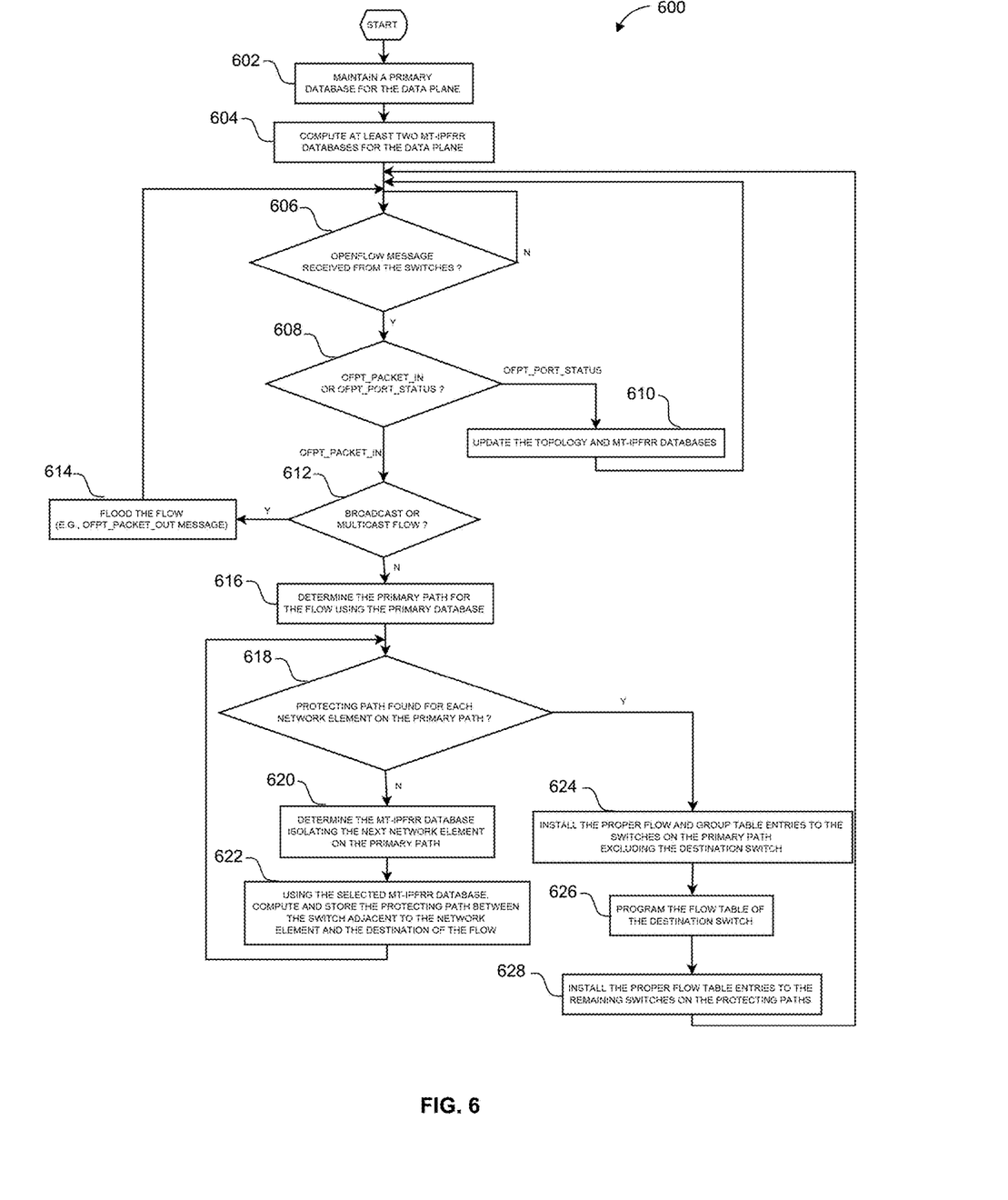
FIG. 6 illustrates a method 600 for performing MTR-IPFRR in accordance with some embodiments of the present invention.

Referring now to FIG. 6, a method 600 for performing MTR-IPFRR in software defined networks is illustrated in accordance with some embodiments of the present invention.

Method 600 includes, at block 602, discovering the topology of the forwarding plane and determining or computing primary forwarding tables for each node in the forwarding plane. In one example, the physical topology of the data plane is discovered through a link discovery protocol such as Link Layer Discovery Protocol (LLDP), and the primary forwarding table for each switch (or node) in the network is computed based on the discovered topology. The method continues to block 604.

Method 600 further includes, at block 604, determining or computing a plurality of VTs (e.g., at least two) and each corresponding forwarding table based on the topology of the forwarding plane (computation of alternate forwarding tables). For this purpose, a VT computation technique, such as Multiple Routing Configurations (MRC) or Maximally Redundant Trees (MRT), can be used. These techniques construct VTs with the same nodes and links as in the physical topology, but with different link weights. The MRC technique requires a sufficiently large number of VTs (?2) to be configured as an input to its algorithm while the MRT technique computes two VTs. Therefore, if the MRC technique is used, the number of VTs should be incrementally configured starting from 2 until the MRC successfully terminates for the first time. The method continues to decision block 606.

Method 600 further includes, at decision block 606, identifying a message, advertisement, and/or announcement (e.g., OpenFlow messages) coming from the nodes of the forwarding plane to decide if a new traffic flow is initiated in the forwarding plane. If no message is detected and/or received (N), the method loops to the start of decision block

606. If a message is detected and/or received (Y), the method continues to decision block 608.

Method 600 further includes, at decision block 608, deciding if a new traffic flow is initiated in the forwarding plane, or if a network element has been added to, modified, or failed in the forwarding plane/network. For this purpose, OFPT_PACKET_IN and OFPT_PORT_STATUS messages from the switches are listened for, which signal the events of the initiation of a new flow in the data plane and the addition/modification/failure of a network element, respectively. If a new traffic flow is detected at decision block 608, the method continues to decision block 612, and if an addition/modification/failure is detected in the forwarding plane at decision block 608, the method continues to block 610.

Method 600 further includes, at block 610, updating the topology information regarding the forwarding plane, recomputing the primary forwarding tables, and recomputing the VTs and their corresponding forwarding tables, based upon the addition/modification/failure detected in the network (recomputation of primary and alternate forwarding tables). In other words, if a network element is detected to be added/modified/failed in the data plane, the topology information is updated, and the corresponding primary and alternate forwarding tables are re-computed. The method then continues by looping to the start of decision block 606.

Method 600 further includes, at decision block 612, deciding if the detected new flow is a broadcast and multicast flow (handling of broadcast and multicast flows). If the new flow is a broadcast and multicast flow (Y), the method continues to block 614, and if the new flow is not a broadcast and multicast flow (N), the method continues to block 616.

Method 600 further includes, at block 614, flooding the broadcast and multicast flows in the forwarding plane. Thus, the broadcast and multicast flows can be delivered to their recipients by flooding them in the data plane using OFPT_PACKET_OUT messages. The method continues by looping to the start of decision block 606.

Method 600 further includes, at block 616, determining or computing the primary path for the current flow using the pre-computed primary forwarding tables. The method continues to decision block 618.

Method 600 further includes, at decision block 618, block 620, and block 622 the determination of the protecting paths.

Decision block 618 includes deciding if a protecting path is found for each network element on the primary path. If a protecting path is not found for each network element on the primary path (N), the method continues to block 620. If a protecting path is found for each network element on the primary path (Y), the method continues to block 624.

Method 600 further includes, at block 620, determining the MTR-IPFRR database isolating the next network element on the primary path (i.e., determining the VT where the network element is isolated). The method continues to block 622.

Method 600 further includes, at block 622, using the selected MTR-IPFRR database to compute and store the protecting path between the node adjacent to the protected network element and the destination of the flow (i.e., determining the protecting path of the network element using the selected VT). Thus, for each network element on the primary path, the pre-computed VT, where the network element is isolated from relaying any network traffic, is determined (block 620), and the protecting path of the network element is computed using the selected VT (block 622). A protecting path is computed between the switch adjacent to the protected network element and the destination switch of the flow. This is due to the fact that, in the case that a network element in the data plane fails, the traffic flows affected from the failure are continued to be routed over the same network elements as in the primary path up to the switch adjacent to the failure while the switch adjacent to the failure changes over the protecting path to forward the affected traffic to its destination. Note that, in the case that the MRC technique is used for the VT construction, a protecting path can protect both an inter-switch link on the primary path and the remote end-point switch of the same link as long as the protecting path is computed using the VT where the remote end-point switch is isolated from transiting any traffic. The method then loops to the start of decision block 618.

Method 600 further includes, at blocks 624, 626, and 628, the establishment of the primary and protecting paths.

Block 624 includes installing the proper flow and group table entries to the nodes of the primary path excluding the destination node. The establishment of the primary path in the data plane is prioritized in order to start forwarding the flow as soon as possible. This is accomplished by installing proper flow and fast-failover group table entries into the switches on the primary path. The method continues to block 626.

Figure 7:
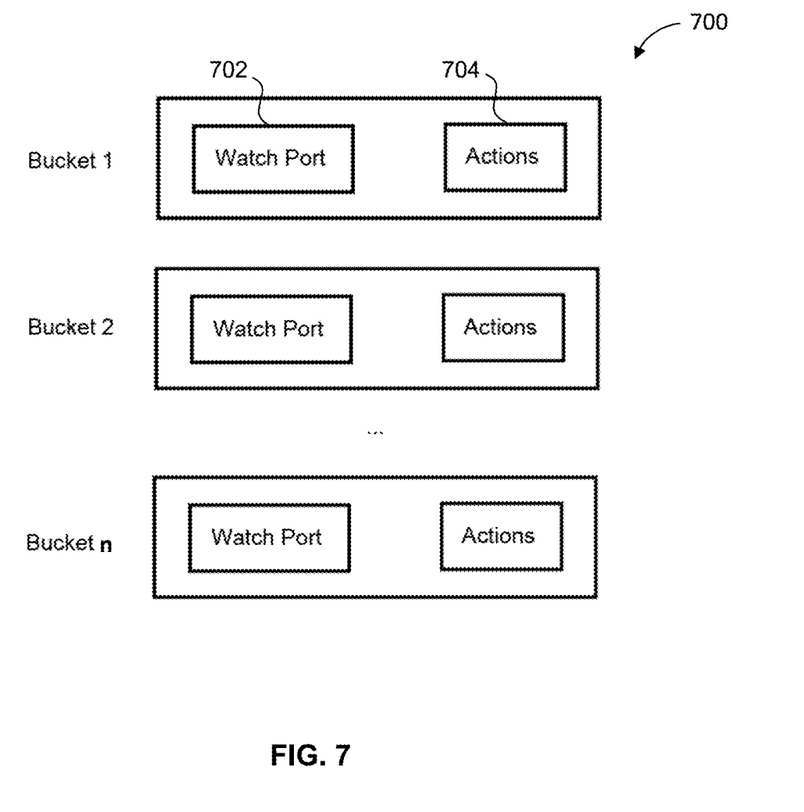
FIG. 7 illustrates a structure of a fast-failover group table including a plurality of buckets in accordance with some embodiments of the present invention.

Method 600 further includes, at block 626, programming the flow table of the destination node. It is possible to compute duplicate flow entries since the same incoming interface of a destination switch may be included in multiple paths including the primary and protecting ones, but the duplicate installation of the flow entries into the destination switch can be easily eliminated. An example of a fast-failover group table is shown in FIG. 7. The method continues to block 628.

Method 600 further includes, at block 628, installing the proper flow table entries to the remaining nodes on the protecting paths. The establishment of the protecting paths is completed by installing the proper flow entries into the remaining switches on the protecting paths. The method then loops to the start of decision block 606.

FIG. 7 illustrates a data structure 700 of a fast-failover group table 700 including a plurality of buckets in accordance with some embodiments of the present invention. A fast-failover group table is composed of one or more buckets, each of which contains a watch port 702 to be acted upon and a set of actions 704. As long as the watch port in the first bucket is up, its corresponding actions are performed. Otherwise, the actions of the next bucket with an up watch port are performed.

Figure 8:
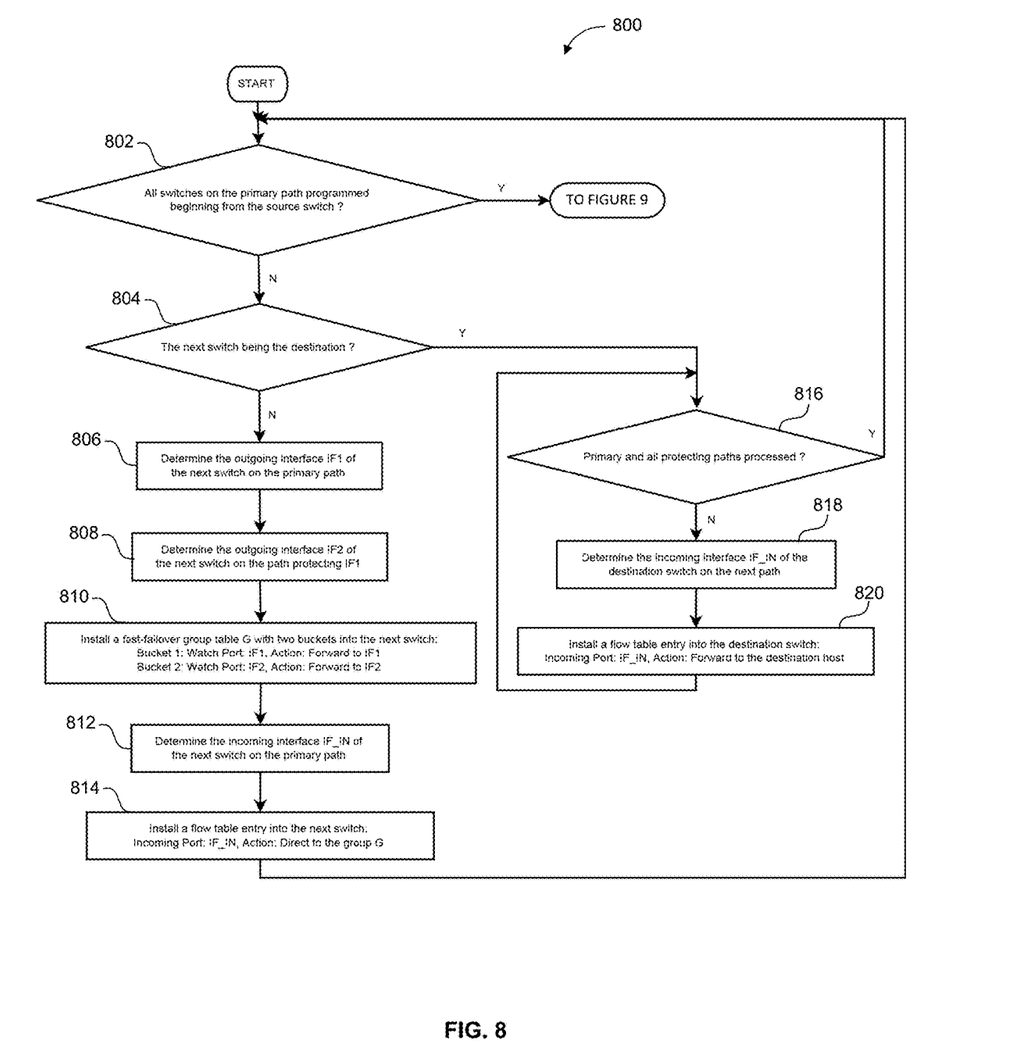
FIGS. 8 and 9 illustrate methods for the establishment of primary and protecting paths in accordance with some embodiments of the present invention.
Figure 9:
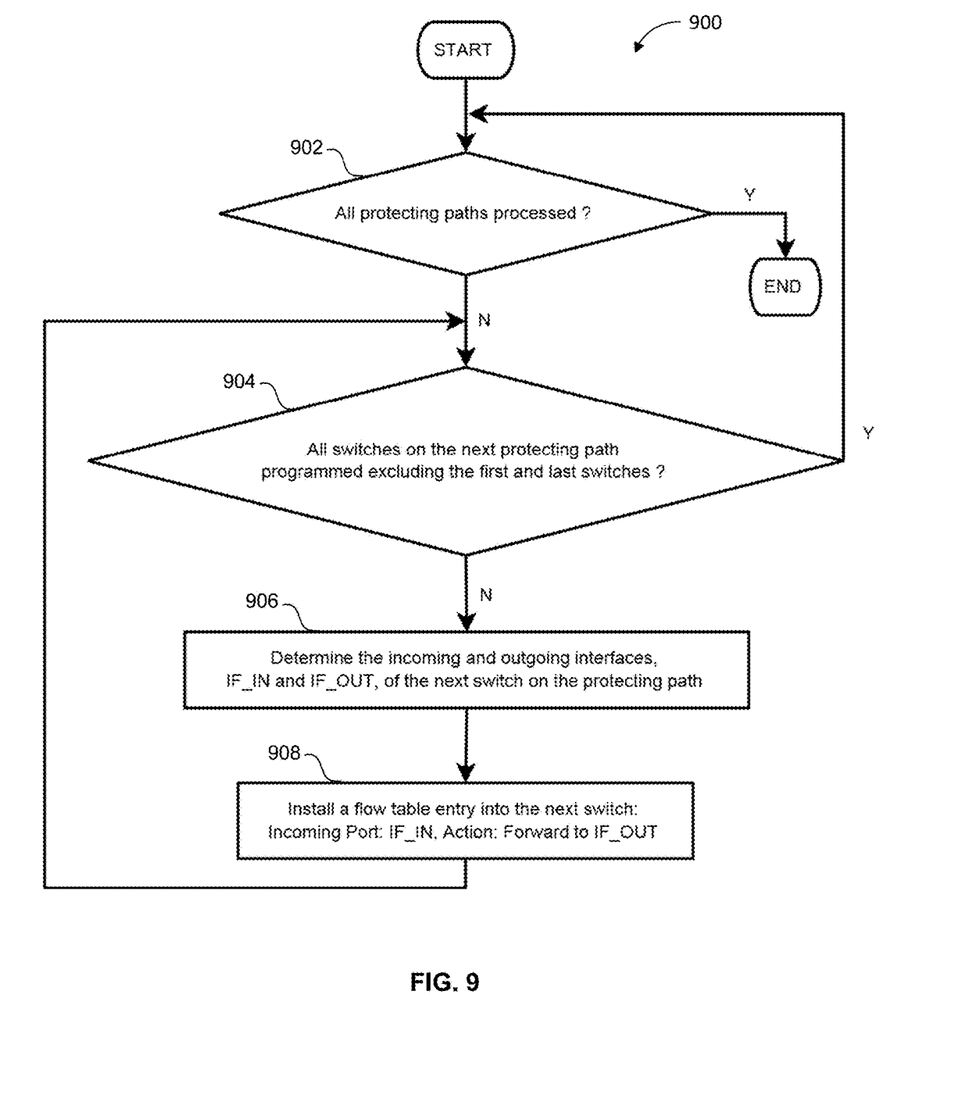

FIGS. 8 and 9 illustrate a method 800 and a method 900 for the establishment of the primary and protecting paths in accordance with some embodiments of the present invention.

Method 800 includes, at decision block 802, deciding if all switches on the primary path have been programmed beginning from the source switch. If yes (Y), the method continues to method 900 of FIG. 9. If no (N), the method continues to decision block 804.

At decision block 804, method 800 includes deciding if the next switch is the destination switch. If yes (Y), the method continues to decision block 816. If no (N), the method continues to block 806.

At block 806, method 800 includes determining the outgoing interface IF1 of the next switch on the primary path. The method continues to block 808.

At block 808, method 800 includes determining the outgoing interface IF2 of the next switch on the path protecting IF1. The method continues to block 810.

At block 810, method 800 includes installing a fast-failover group table G with a plurality of buckets (e.g., 2 buckets) into the next switch: Bucket 1 includes Watch Port: IF1, Action: Forward to IF1; and Bucket 2 includes Watch Port: IF2, Action: Forward to IF2. The method continues to block 812.

At block 812, method 800 includes determining the incoming interface IF_IN of the next switch on the primary path. The method continues to block 814.

At block 814, method 800 includes installing a flow table entry into the next switch: Incoming Port: IF_IN, Action: Direct to the group G. The method then loops to the start of decision block 802.

At block 816, method 800 includes deciding if primary and all protecting paths are processed. If yes (Y), the method loops to the start of decision block 802. If no (N), the method continues to block 818.

At block 818, method 800 includes determining the incoming interface IF_IN of the destination switch on the next path. The method continues to block 820.

At block 820, method 800 includes installing a flow table entry into the destination switch: Incoming Port: IF_IN, Action: Forward to the destination host. The method then loops to the start of decision block 816.

Referring now to FIG. 9, method 900 includes at decision block 902, deciding if all protecting paths have been processed. If yes (Y), the method ends. If no (N), the method continues to decision block 904.

At block 904, method 900 includes deciding if all switches on the next protecting path are programmed, excluding the first and last switches. If yes (Y), the method loops to the start of decision block 902. If no (N), the method continues to block 906.

At block 906, method 900 includes determining the incoming and outgoing interfaces, IF_IN and IF_OUT, of the next switch on the protecting path. The method continues to block 908.

At block 908, method 900 includes installing a flow table entry into the next switch: Incoming Port: IF_IN, Action: Forward to IF_OUT. The method then loops to the start of decision block 904.

It is noted that the first and last switches of a protecting path are ignored in method 900 of FIG. 9 since these switches are part of the primary path, and, hence, are already programmed prior to this stage.

Figure 10:
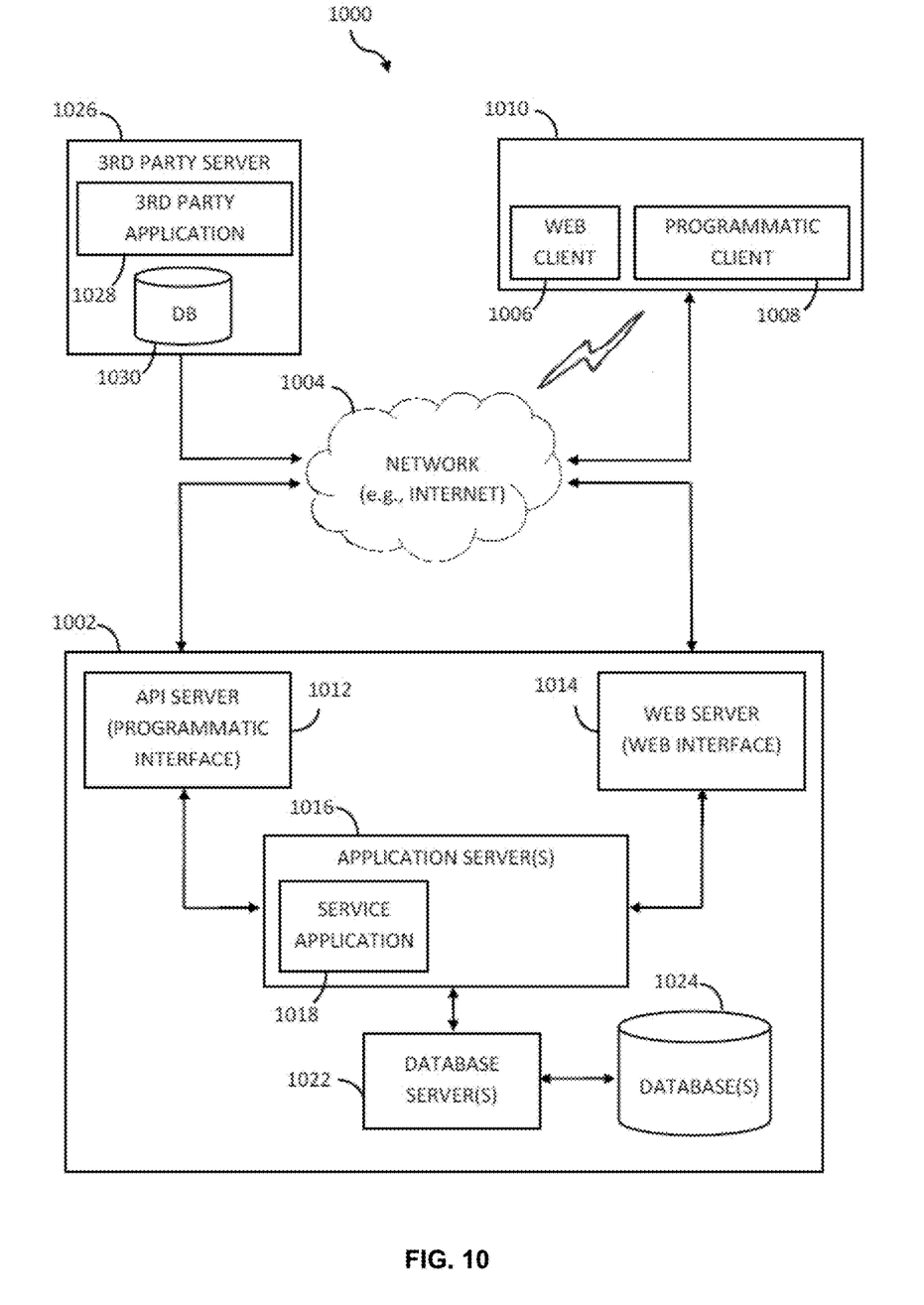
FIG. 10 illustrates a network diagram depicting an example system for performing MTR-IPFRR according to some embodiments of the present invention.

Referring now to FIG. 10, a network diagram depicts an example system 1000 for performing MTR-IPFRR processing according to some embodiments of the present invention. A networked system 1002 forms a network-based control system that provides server-side functionality, via a network 1004 (e.g., the Internet or Wide Area Network (WAN)), to one or more clients and devices. FIG. 10 further illustrates, for example, one or both of a web client 1006 (e.g., a web browser) and a programmatic client 1008 executing on a device machine 1010 according to any of the embodiments noted above. In one embodiment, the system 1000 comprises a network control system.

Device machine 1010 may comprise a computing device that includes at least communication capabilities with the network 1004 to access the networked system 1002. Device machine 1010 may connect with the network 1004 via a wired or wireless connection. For example, one or more portions of network 1004 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

An Application Program Interface (API) server 1012 and a web server 1014 are coupled to, and provide programmatic and web interfaces respectively to, one or more application servers 1016. The application servers 1016 may host one or more applications (e.g., MTR-IPFRR service application 1018) in accordance with an embodiment of the present invention. Application servers 1016 may further include payment applications and other applications that support a recovery routing service. The application servers 1016 are, in turn, shown to be coupled to one or more databases servers 1022 that facilitate access to one or more databases 1024.

While the MTR-IPFRR service application 1018 is shown in FIG. 10 to form part of the networked system 1002, it will be appreciated that, in alternative embodiments, the service application may form part of a network recovery application service that is separate and distinct from the networked system 1002 or separate and distinct from one another.

Further, while the system 1000 shown in FIG. 10 employs a client-server architecture, embodiments of the present disclosure is not limited to such an architecture, and may equally well find application in, for example, a distributed or peer-to-peer architecture system. The various service applications 1018 may also be implemented as standalone software programs, which do not necessarily have networking capabilities.

The web client 1006 accesses the various network routing/recovery applications 1018 via the web interface supported by the web server 1014. Similarly, the programmatic client 1008 accesses the various services and functions provided by the applications 1018 via the programmatic interface provided by the API server 1012.

The systems, apparatus, and methods according to example embodiments of the present invention may be implemented through one or more processors, servers, and/or client computers in operable communication with one another.

Figure 11:
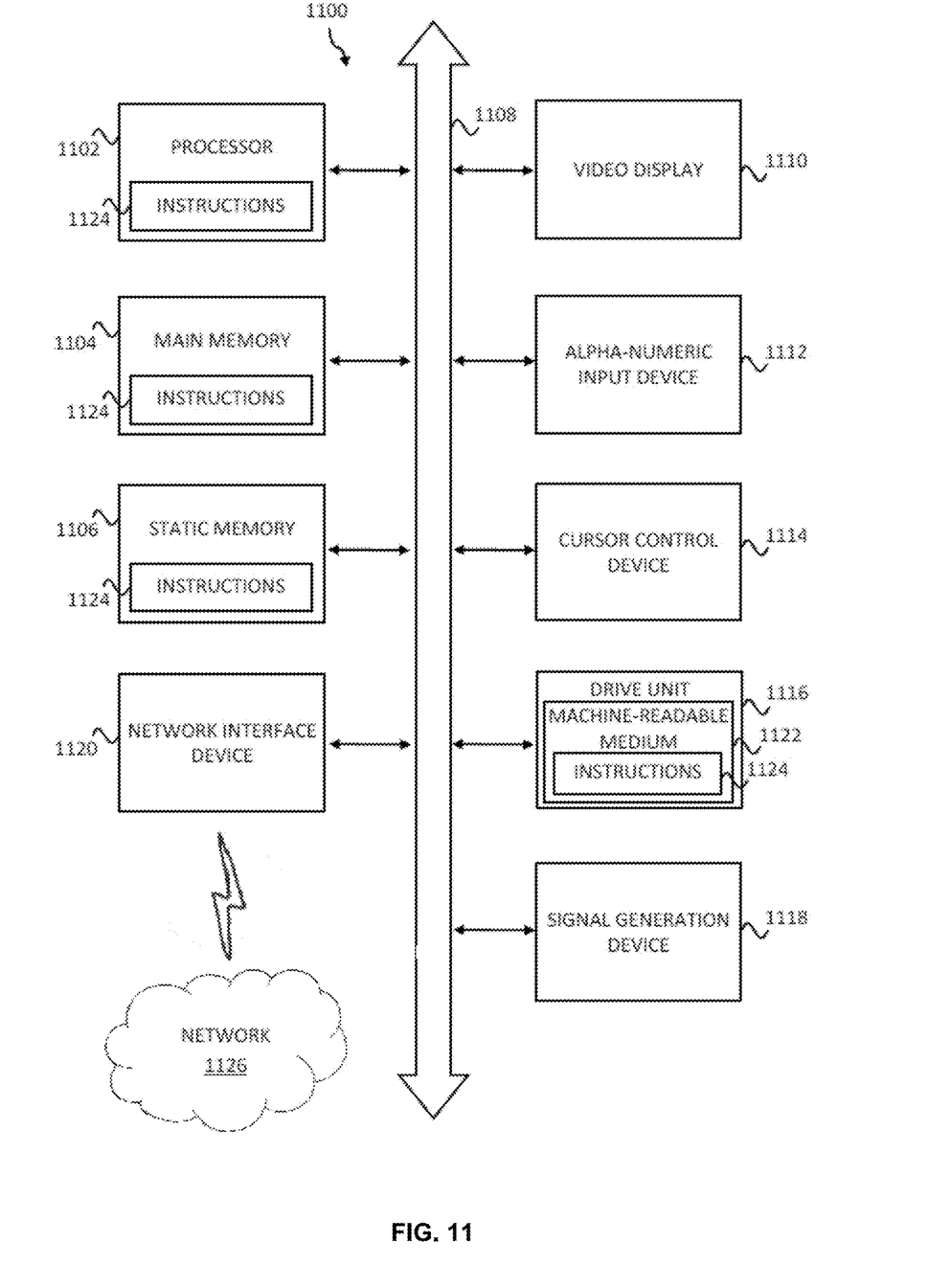
FIG. 11 illustrates a diagrammatic representation of a machine in the example form of a computer system, within which a set of instructions may be carried out for performing any one or more of the MTR-IPFRR methods according to some embodiments of the present invention.

FIG. 11 illustrates a diagrammatic representation of a machine 1100 in the example form of a computer system, within which a set of instructions may be carried out for causing an SDN controller or MTR-IPFRR module to perform any one or more of the methods according to some embodiments of the present invention.

The computer system 1100 or parts thereof may comprise, for example, all or part of the device machine 1010, applications servers 1016, API server 1012, web server 1014, database servers 1022, or third party server 1026. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., liquid crystal display (LCD), inorganic/organic light emitting diode (LED/OLED), touch screen, or a cathode ray tube (CRT)). The computer system 1100 also includes an alphanumeric input device 1112 (e.g., a physical or virtual keyboard), a cursor control device 1114 (e.g., a mouse, a touch screen, a touchpad, a trackball, a trackpad, a disk drive unit 1116, a signal generation device 1118 (e.g., a speaker) and a network interface device 1120.

The disk drive unit 1116 includes a machine-readable medium 1122 on which is stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Embodiments of the present invention may be embodied as a system, method, or computer program product (e.g., embodiments directed toward a MTR-IPFRR system, method, or computer program product). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". For example, an MTR-IPFRR method may be embodied in a software and hardware system that can be housed in a portable device such as a tablet, laptop, camera, phone, and the like. In another example, a client and server computer in operable communication and combination, may be in its entirety said to be embodied in a system. Furthermore, aspects of the present embodiments of the disclosure may take the form of a computer program product embodied in one or more computer readable medium/media having computer readable program code embodied thereon. Methods may be implemented in a special-purpose computer or a suitably programmed general-purpose computer.

Any combination of one or more computer readable medium/media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described above with reference to flowchart illustrations and/or block diagrams of methods, apparatus (systems) and computer program products according to embodiments of the present invention (e.g., FIGS. 1-11). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the invention has been described in detail in connection with only a limited number of embodiments, it should be readily understood that the invention is not limited to such disclosed embodiments. Rather, the invention can be modified to incorporate a number of variations, alterations, substitutions, combinations or equivalent arrangements not heretofore described, but which are commensurate with the spirit and scope of the invention. Furthermore, the various components of the system, apparatus, and methods disclosed above can be alternatives which may be combined in various applicable and functioning combinations within the scope of the present invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

I claim:

1. A software defined networking (SDN) controller for protecting against failure of a network element in a forwarding plane, the SDN controller comprising:
   a processor configured to execute software processes; and
   a memory configured to store a multi-topology routing based IP Fast Re-Route (MTR-IPFRR) process executable by the processor, the MTR-IPFRR process configured to:
   discover a physical topology of the forwarding plane;
   determine a primary forwarding table for each node of the forwarding plane based upon the discovered physical topology;
   compute a plurality of virtual topologies (VT) based upon the discovered physical topology using Multiple Routing Configurations (MRC) technique;
   configure a memory to store a plurality of multi-topology routing (MTR) databases, each MTR database for an independent virtual topologies constructed based upon the physical topology by using the MRC technique;
   if a new traffic flow is detected in the forwarding plane, determine a primary path for relaying network traffic to a destination node using the primary forwarding tables;
   for each network element along the primary path, determine and associate the VT which protects the network element from relaying network traffic;
   determine a protecting path for each protected network element along the primary path using an associated VT; and
   program each node along the primary path to be switchable to a protecting path associated with an adjacent network element to reroute network traffic from an anticipated failed network element.

2. The SDN controller of claim 1, wherein the protected network element is selected from a group consisting of a node, a plurality of nodes, a link, and a plurality of links.

3. The SDN controller of claim 1, wherein each VT includes the same nodes and links as in a physical topology of the forwarding plane, and further wherein each VT has different link weights from each other.

4. The SDN controller of claim 1, wherein the MTR-IPFRR process is further configured to install a fast-failover group table including a plurality of buckets, each bucket including a watch port and a corresponding action.

5. The SDN controller of claim 4, wherein the corresponding action is an action into each node along the primary path excluding the destination node, such that the first bucket allows for forwarding of the network traffic according to the primary path and the second bucket allows for switching to a protecting path if the adjacent protected network element is detected to have failed.

6. The SDN controller of claim 1, wherein the MTR-IPFRR process is further configured to install flow table entries into remaining nodes on the protecting path.

7. The SDN controller of claim 6, wherein the MTR-IPFRR process is further configured to eliminate installation of duplicate flow table entries.

8. The SDN controller of claim 1, wherein the MTR-IPFRR process is further configured to receive broadcast and multicast flows including a status of at least one link or node of the forwarding plane.

9. A method for protecting against failure of a network element in a forwarding plane of a Software Defined Network, the method comprising:
   discovering a physical topology of the forwarding plane via a link discovery protocol;
   determining a primary forwarding table for each node of the forwarding plane based upon the discovered physical topology;
   compute a plurality of virtual topologies (VT) based upon the discovered physical topology using Multiple Routing Configurations (MRC) technique;
   configure a memory to store a plurality of multi-topology routing (MTR) databases, each MTR database for an independent virtual topologies constructed based on the physical topology by using the MRC technique;
   if a new traffic flow is detected in the forwarding plane, determining a primary path for relaying network traffic to a destination node using the primary forwarding tables;
   for each network element along the primary path, determining and associating a VT which protects the network element from relaying network traffic;
   determining a protecting path for each protected network element along the primary path using an associated VT; and
   programming each node along the primary path to be switchable to a protecting path associated with an adjacent network element to reroute traffic from an anticipated failed network element.

10. The method of claim 9, wherein each VT is determined to include the same nodes and links as in a physical topology of the computer network, and further wherein each VT is determined to have different link weights from each other.

11. The method of claim 9, further comprising installing a fast-failover group table including a plurality of buckets, each bucket including a watch port and a corresponding action into each node along the primary path excluding the destination node, such that the first bucket allows for forwarding of the network traffic according to the primary path and the second bucket allows for switching to a protecting path if the adjacent protected network element is detected to have failed.

12. The method of claim 9, further comprising installing flow table entries into remaining nodes on the protecting path, and eliminating installation of duplicate flow table entries.

13. The method of claim 9, further comprising receiving broadcast and multicast flows including a status of at least one link or node of the forwarding plane.

* * * * *